US007660849B1

(12) United States Patent
Shaffer et al.

(10) Patent No.: US 7,660,849 B1
(45) Date of Patent: Feb. 9, 2010

(54) EXTENDING CAMP-ON CAPABILITIES TO INVITEES TO AN ONGOING CONVERENCE CALL

(75) Inventors: Shmuel Shaffer, Palo Alto, CA (US); Charles J. Bedard, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/460,089

(22) Filed: Dec. 14, 1999

(51) Int. Cl.
*G06F 15/16* (2006.01)

(52) U.S. Cl. .................. 709/204; 709/205; 709/206; 709/207; 709/227; 709/228; 709/230; 709/249; 370/261; 370/271; 379/219

(58) Field of Classification Search .................. 704/204; 379/202.07
See application file for complete search history.

(56) References Cited

U.S. PATENT DOCUMENTS

| | | | | |
|---|---|---|---|---|
| 5,408,518 A | * | 4/1995 | Yunoki | 379/202.01 |
| 5,422,883 A | * | 6/1995 | Hauris et al. | 370/261 |
| 5,828,743 A | * | 10/1998 | Pinnell et al. | 379/204.01 |
| 5,907,324 A | * | 5/1999 | Larson et al. | 345/753 |
| 5,991,276 A | * | 11/1999 | Yamamoto | 370/260 |
| 5,999,525 A | * | 12/1999 | Krishnaswamy et al. | 370/352 |
| 6,011,782 A | * | 1/2000 | DeSimone et al. | 370/260 |
| 6,148,068 A | * | 11/2000 | Lowery et al. | 379/202.01 |
| 6,160,881 A | * | 12/2000 | Beyda et al. | 379/209.01 |
| 6,192,119 B1 | * | 2/2001 | Wilson | 379/202.01 |
| 6,243,452 B1 | * | 6/2001 | O'Shaughnessey et al. | 379/201.01 |
| 6,272,214 B1 | * | 8/2001 | Jonsson | 379/202.01 |
| 6,301,609 B1 | * | 10/2001 | Aravamudan et al. | 709/207 |
| 6,393,481 B1 | * | 5/2002 | Deo et al. | 709/224 |
| 6,433,795 B1 | * | 8/2002 | MacNaughton et al. | 715/738 |
| 6,463,038 B1 | * | 10/2002 | Wilson | 370/261 |
| 6,683,870 B1 | * | 1/2004 | Archer | 370/356 |
| 6,694,375 B1 | * | 2/2004 | Beddus et al. | 709/249 |
| 6,754,322 B1 | * | 6/2004 | Bushnell | 379/202.01 |
| 6,853,634 B1 | * | 2/2005 | Davies et al. | 370/349 |
| 6,909,708 B1 | * | 6/2005 | Krishnaswamy et al. | 370/352 |
| 7,480,260 B1 | * | 1/2009 | Vashisht et al. | 370/260 |
| 7,542,780 B2 | * | 6/2009 | Hoglander et al. | 455/555 |
| 2001/0043697 A1 | * | 11/2001 | Cox et al. | 379/265.06 |

\* cited by examiner

*Primary Examiner*—Syed A. Zia
(74) *Attorney, Agent, or Firm*—Campbell Stephenson LLP

(57) ABSTRACT

A method and system for extending Camp-On Capabilities to invitees to an ongoing conference call. In one embodiment, a persistent invitation is extended to a first network station client to join a conference call in response to a determination that the first network station client is unavailable to accept a non-persistent invitation to join the conference call, and the first network station client is added to the conference call when the first network station client accepts the persistent invitation to join the conference call. In another embodiment, a persistent invitation to join an ongoing conference call is presented to an initially unavailable network station client, and the persistent invitation to join the ongoing conference call is accepted in response to user input to a network station client including but not limited to the initially unavailable network station client and another network station client where the user has been authenticated.

59 Claims, 5 Drawing Sheets

Participants "A", "B", and "C" in Conference invite User "D" who is in call with User "E"

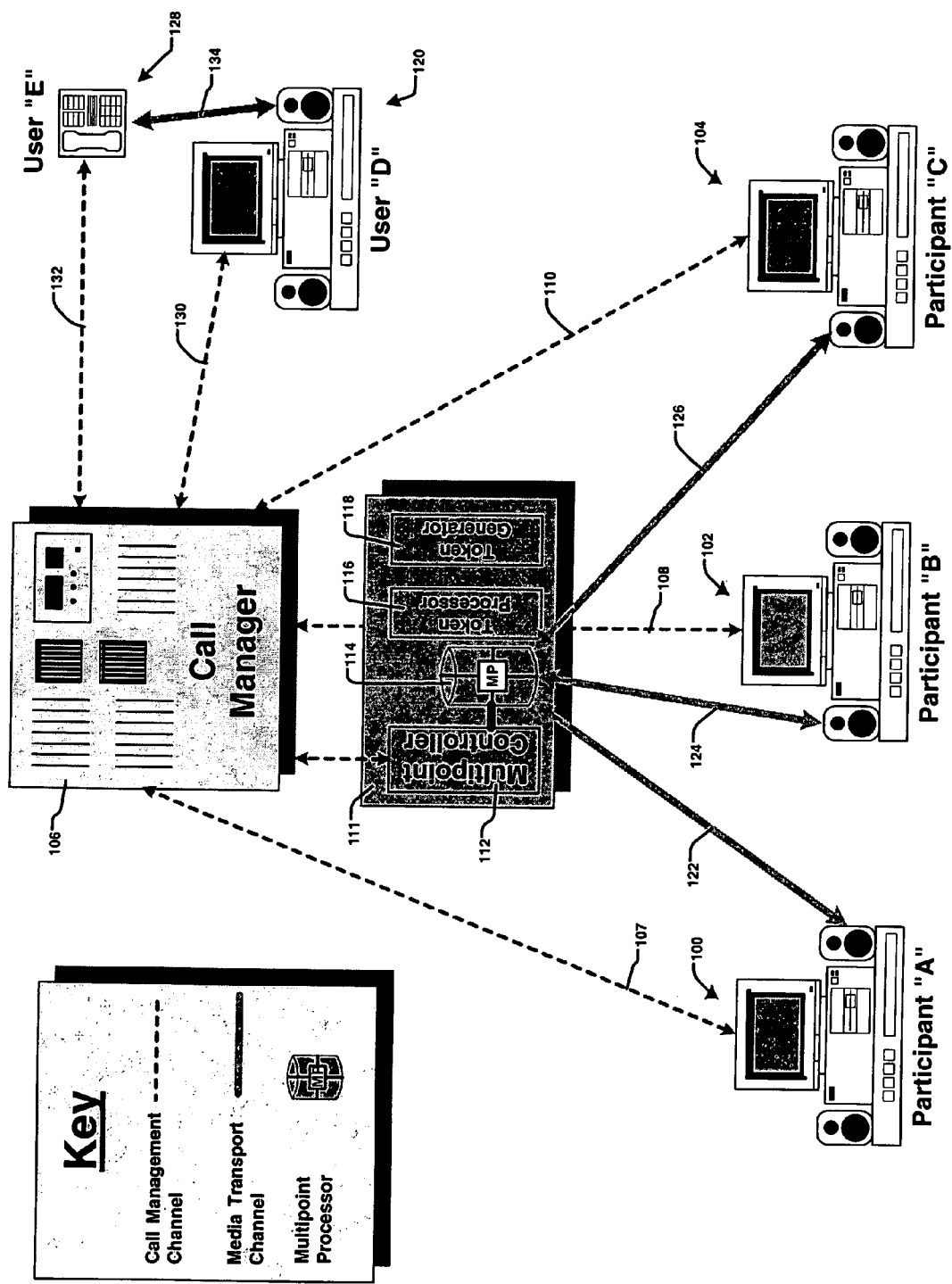
Figure 1: Participants "A", "B", and "C" in Conference User "D" in call with User "E"

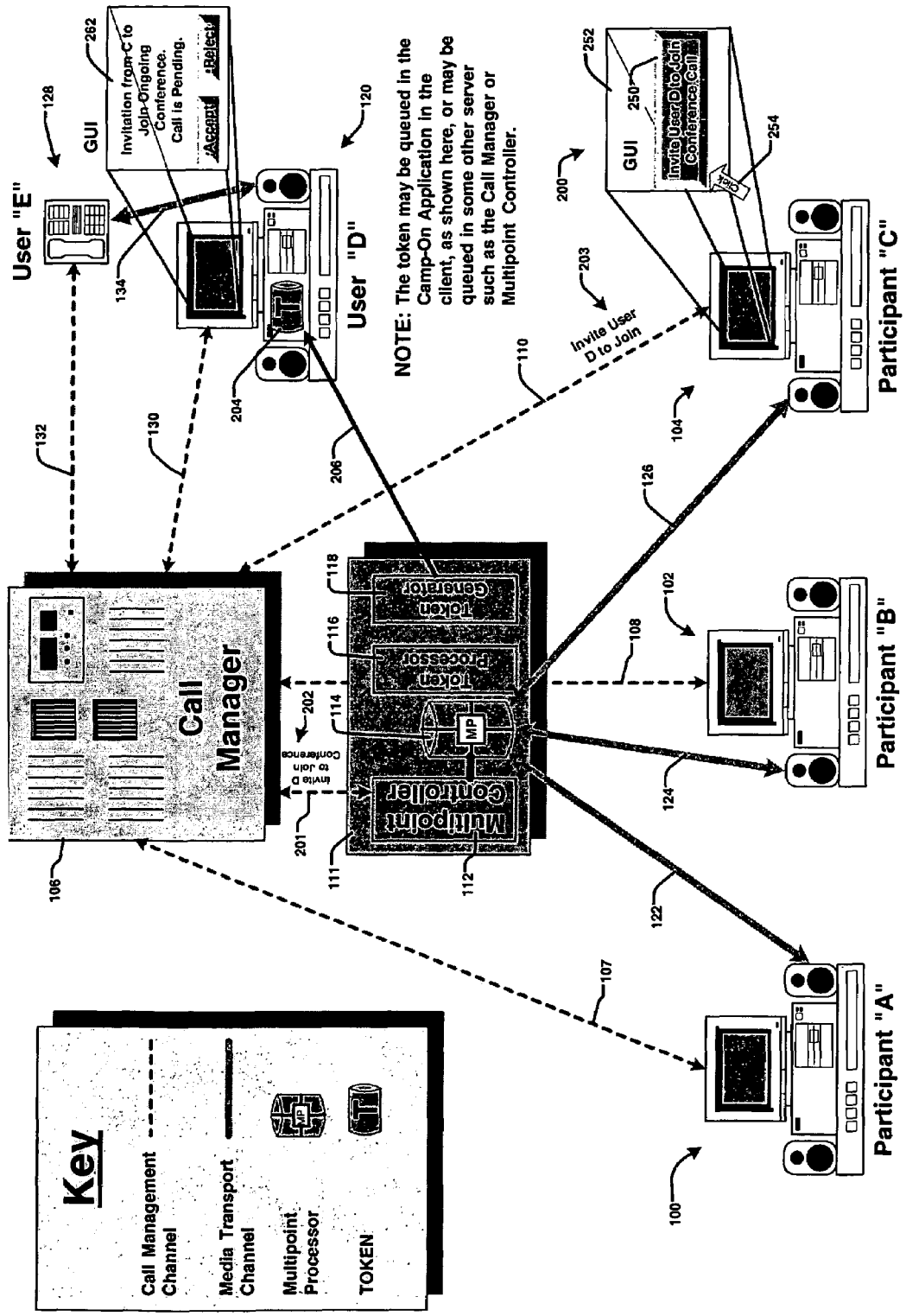
Figure 2: Participants "A", "B", and "C" in Conference invite User "D" who is in call with User "E"

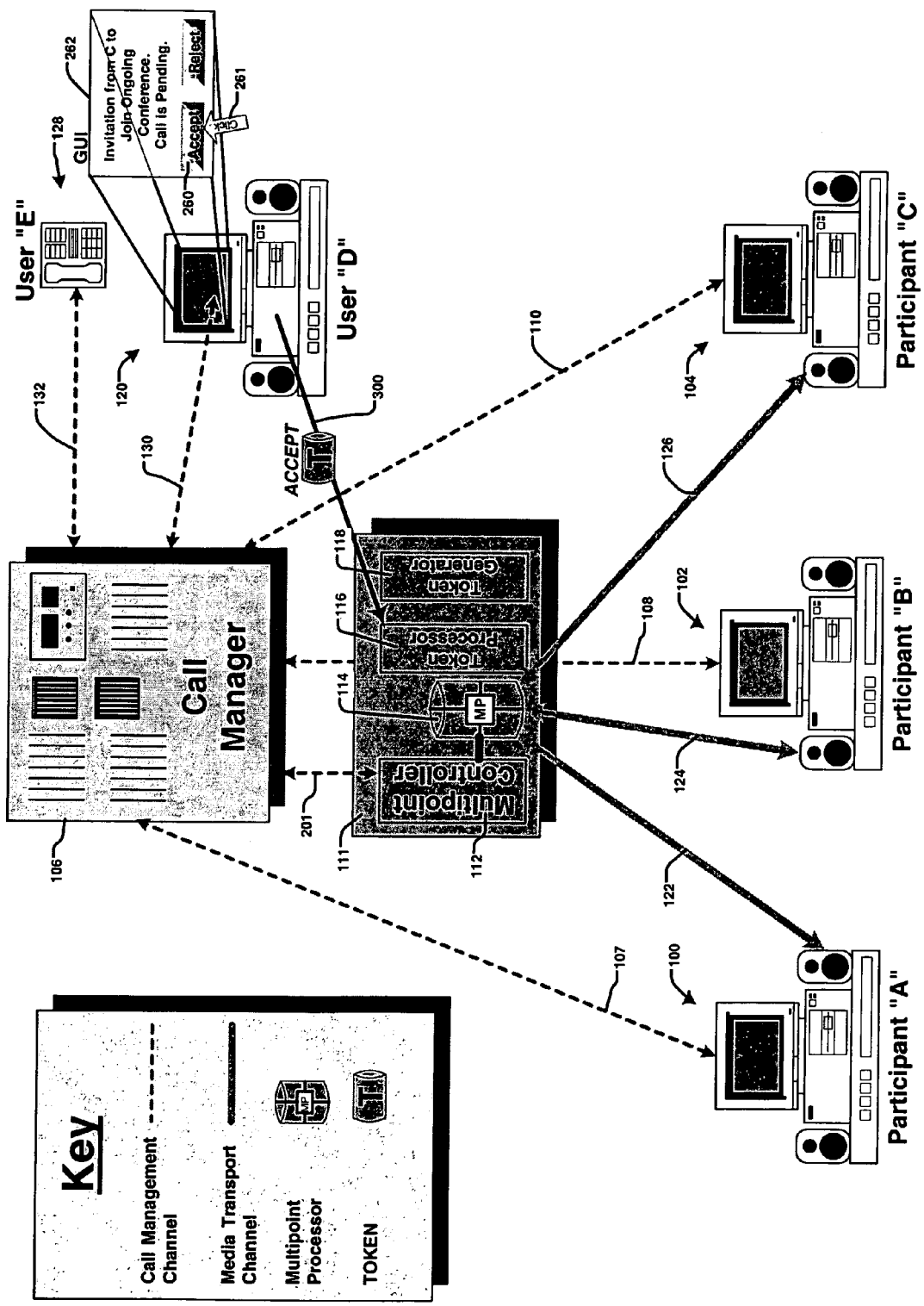
Figure 3: Participants "A", "B", and "C" in Conference
Participant "D" Accepts Invitation using Token

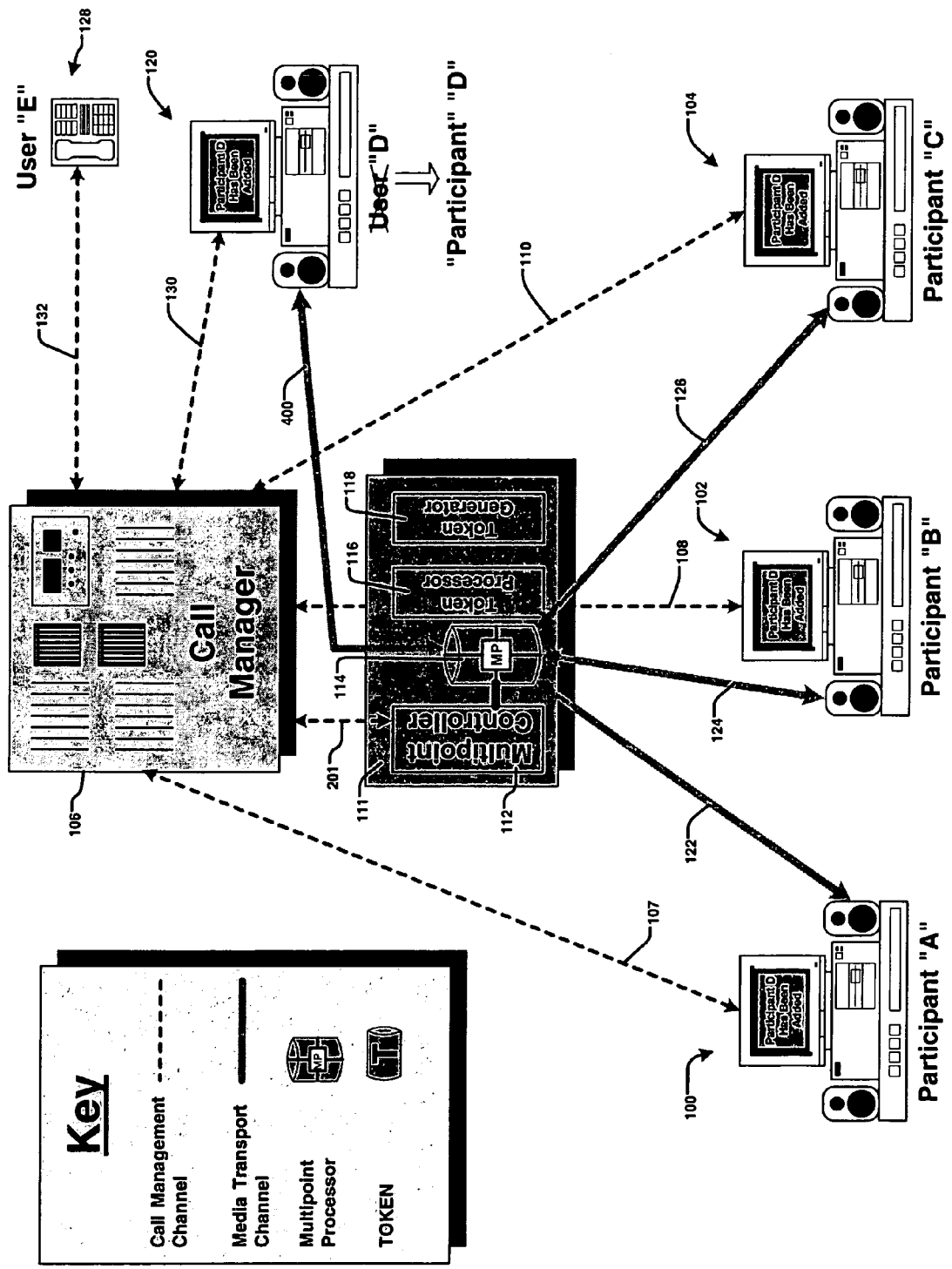
Figure 4: Participants "A", "B", "C" and "D" in Conference

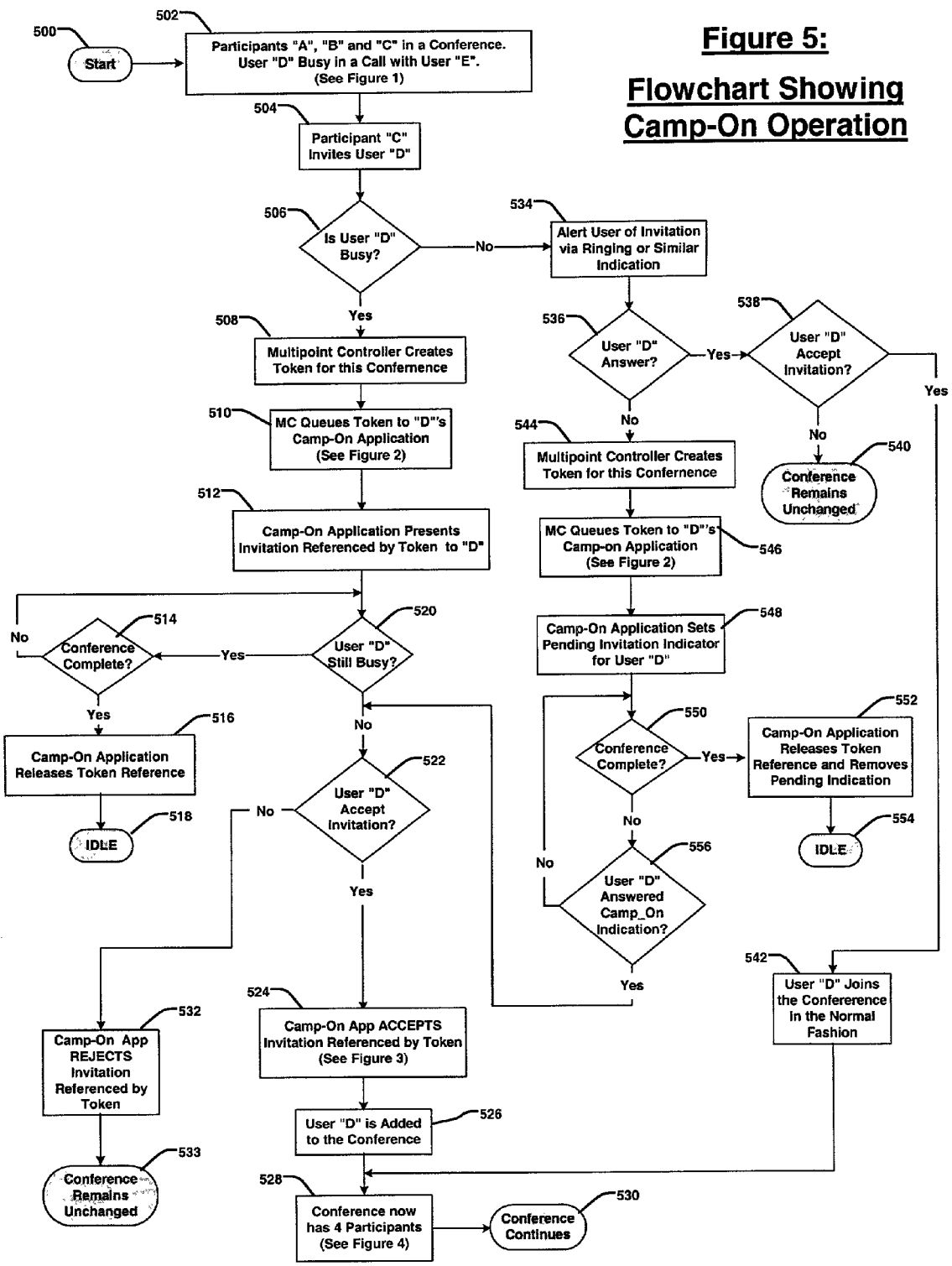

EXTENDING CAMP-ON CAPABILITIES TO INVITEES TO AN ONGOING CONVERENCE CALL

BACKGROUND OF THE INVENTION

The present invention is related to a method and system to be utilized in data communications involving at least one data communications network.

DESCRIPTION OF THE RELATED ART

Data communications is the transfer of data from one or more sources to one or more sinks that is accomplished (a) via one or more data links between the one or more sources and the one or more sinks (b) according to a protocol. A data link is the means of connecting communications facilities or equipment at one location to communications facilities or equipment at another location for the purpose of transmitting and receiving data. A protocol, in communications, computer, data processing, and control systems, is a set of formal conventions that govern the format and control the interactions between at least two communicating functional elements in order to achieve efficient and understandable communications. Examples of protocols are Internet Protocol (IP), Asynchronous Transfer Mode (ATM) protocol, H.323 (an ITU-T standard), Media Gateway Control Protocol (MGCP), and Simple Network Management Protocol (SNMP).

A data communications network is the interconnection of two or more network station clients (i.e., data sources and/or sinks) over one or more data links. A data communications network connects and allows communication between multiple network station clients over one or more data links.

A conference call is a network-provided service feature that allows a call to be established among three or more network station clients in such a manner that each of the stations is able to communicate with all other stations. Existing data communication equipment for establishing conference calls typically works in one of two modes: ad hoc conference mode, and "meet me" conference mode. In ad hoc conference mode, two network station clients are initially communicating. Thereafter, at least one of the initially communicating network station clients invokes the conference call feature of the data communications network of which the network station clients are a part, and identifies one or more network station clients to be added in order to convert the two station call into a conference call. In "meet me" conference mode a conference is scheduled in advance, and network station clients scheduled to participate in the conference call are given the network address of the conference service, the conference ID by which the scheduled conference will be identified, and a password that allows the network station clients scheduled to participate to gain access to the conference call.

The present inventors have noted deficiencies in the ad hoc conference mode and "meet me" conference mode. One deficiency in the ad hoc conference mode is that, if an invited network station client is unavailable when an invitation to join the conference call is extended, no practical mechanism exists to persistently invite (meaning that the invitation persists only so long as the conference is ongoing or only so long as specified by the inviting party) the unavailable network station client to join the conference when the invited network station client does become available. One deficiency in the "meet me" conference mode is that, once the "meet me" conference has been established, there is typically no mechanism to persistently invite and add network station clients not originally scheduled to be part of the "meet me" conference, by invitation, if the invited network station client is unavailable when the invitation to join the "meet me" conference call is extended (a mechanism in conventional "meet me" conferencing does exist to invite participants after a conference call has begun, but this mechanism does not give an indication of a persistent invitation, nor does it withdraw the invitation when the conference call ends). Examples of situations where invited network station clients are "unavailable" are when the invited network station client is busy in conversation with another network station client, or when the invited network station client does not substantially immediately answer the invitation (e.g., because the human user of the invited network station client is away from the network station client when the invitation to join the conference call is received).

As a concrete example of one of the forgoing noted deficiencies, assume that a first and a second person are engaged in a conference call. Assume further that either the first person or second person tries to call yet a third person to invite that third person to join the conference call. Assume yet still further that the third person called doesn't answer the invitation to join the conference call, either because that third person is busy or is away from their desk. Accordingly, the calling party (either the first or second person) leaves a voice mail for the third person that the first and second person are in a conference call, and that the third person was being invited to the conference call. It has been discovered by the inventors named herein that there is no practicable way for the third person to "break in" and join the conference call once the conference call is already in progress. If the third person attempts to call either the first or the second person, typically that third person will receive a busy signal since the first and second person are already engaged in a conference call. The fact that the invited third party cannot enter the conference call at a later time is an example of one deficiency in conventional conference call schemes that has been discovered by the inventors named herein.

SUMMARY OF THE INVENTION

The present inventors have discovered a method and system which, among other things, can be utilized to remedy the deficiencies, described in the related art section above, associated with ad hoc and "meet me" conference modes.

In one embodiment, a persistent invitation is extended to a first network station client to join a conference call in response to a determination that the first network station client is unavailable to accept a non-persistent invitation to join the conference call, and the first network station client is added to the conference call when the first network station client accepts the persistent invitation to join the conference call. In another embodiment, a persistent invitation to join an ongoing conference call is presented to an initially unavailable network station client, and the persistent invitation to join the ongoing conference call is accepted in response to user input to a network station client selected from the group including but not limited to the initially unavailable network station client and another network station client where the user has been authenticated.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art, by referencing the accompanying drawings.

FIG. 1 depicts a data communications environment having a client-server architecture.

FIG. 2 shows a series of events in a data communications environment which occur in response to entry of user data indicating that a network station client is to be invited to join an ongoing conference call.

FIG. 3 depicts an invited network station client accepting an invitation to join an ongoing conference call.

FIG. 4 illustrates the addition of an invited network station client to an ongoing conference call.

FIG. 5 shows a high-level logic flowchart depicting a process by which a network station client can be invited and added to an ongoing conference call.

The use of the same reference symbols in different drawings indicates similar or identical items.

DETAILED DESCRIPTION

The following sets forth a detailed description of a mode for carrying out embodiments described. The description is intended to be illustrative of the invention and should not be taken to be limiting.

With reference to the figures, and in particular with reference now to FIG. 1, shown is a data communications environment having a client-server architecture. Depicted are participant A's network station 100 client, participant B's network station 102 client, and participant C's network station 104 client in a conference call configuration. Participant A's network station 100 client, participant B's network station 102 client, and participant C's network station 104 client are illustrated as resident within desktop personal computer systems having display devices, speakers, microphones, system units, keyboards, mice, and drive units (e.g., CD-ROM, hard disk, floppy, or other drive units), and can be implemented using virtually any IBM-compatible or Apple-compatible personal computer system; furthermore, those skilled in the art will appreciate that network stations discussed herein, such as the depicted network station wherein participant A's network station 100 client resides, can be implemented utilizing virtually any other type of personal computer system, such as notebook and subnotebook personal computer systems. It will also be appreciated by those within the art that network stations discussed herein can also be implemented as voice terminals, which are essentially personal computer systems in a standard telephone-shaped shell (e.g., user E's network station 128).

Illustrated is that participant A's network station 100 client, participant B's network station 102 client, and participant C's network station 104 client are in communication with and under the control of call manager 106. Call manager 106 is depicted as resident within a network server computer, and can be implemented using virtually any network server computer such as Cisco System's MCS 7830. Participant A's network station 100 client, participant B's network station 102 client, and participant C's network station 104 client respectively communicate with call manager 106 via call management channels 107, 108, and 110. Those skilled in the art will recognize that each management channel shown herein, such as call management channels 107, 108, and 110, may be logical communication channels (e.g., time-slotted channels, IP channels, or other packet or packet-like channels) or actual physical communication channels (e.g., hardwired channels). Note that call management channel 108 is shown in FIG. 1 as being drawn, or illustrated, behind conferencing engine 111, which is intended to show that call management channel 108 exists between call manager 106 and participant B's network station 102 client; that is, call management channel 108 does not directly interact with conferencing engine 111.

Shown resident within, and under the control of call manager 106, is conferencing engine 111 having multipoint controller 112, multipoint processor 114, token processor 116, and token generator 118. (Those skilled in the art will appreciate that conferencing engine 111 is a logical entity responsible for managing conferencing capabilities under the control of call manager 106. Conferencing engine, or server, 111 may be an independent (i.e., stand-alone) server, or it can reside in call manager 106, or alternatively it can reside in one of the participating network stations' clients/endpoints.) Multipoint controller 112 is a conferencing engine 111 component that manages the participants' access into a conference and manages multipoint processor 114 in conferencing engine 111. Multipoint processor 114 is a conferencing engine 111 component that ensures that data is appropriately duplicated and sent to various participants engaging in a conference (e.g., duplicating and sending conference call data to participant A's network station 100 client, participant B's network station 102 client, and participant C's network station 104 client). Depicted is that multimedia data exchanged between multipoint processor 114 and participant A's network station 100 client, participant B's network station 102 client, and participant C's network station 104 client, respectively travel via media transport channels 122, 124, and 126. Those skilled in the art will appreciate that each media transport channel shown herein, such as media transport channels 122, 124, and 126 can be either a logical communications channel or an actual physical communications channel.

In addition to the foregoing, further depicted is user D's network station 120 client (as used herein, a "participant" network station client indicates that the network station client is participating in a conference call, while a "user" network station client is not currently participating in a conference call; when a "user" network station client joins a conference call, the "user" network station client becomes a "participant" network station client) in conversation with user E's network station 128 client over media transport channel 134. Illustrated is that user D's network station 120 client and user E's network station 128 client are in communication with and under the control of call manager 106. User D's network station 120 client and user E's network station 128 client respectively communicate with call manager 106 via call management channels 130, and 132.

In addition to the foregoing, further depicted are token processor 116 and token generator 118 under the control of multipoint processor 114. Token processor 116 and token generator 118 are utilized to allow a persistent invitation to be extended to one or more network station clients to join the depicted ongoing conference call in a fashion which will now be described.

FIG. 1, for ease of illustration, shows conferencing engine 111, multipoint controller 112, multipoint processor 114, token processor 116, and token generator 118 as physically co-located. However, it will be understood by those having ordinary skill in the art that each of the foregoing noted communications entities could be located in any one of a number of different physical locations throughout the network, and that such entities could relatively easily maintain their herein described logical relationships by techniques well known to those having ordinary skill in the art. That is, the locations of various communications entities depicted herein are meant to be illustrative and are not to be taken as limiting.

Referring now to FIG. 2, depicted is event 200 wherein participant C enters data, typically using a mouse, by pointing graphical pointer 254 to "invite user D to join conference" button 250 within graphical user interface (GUI) 252 and "clicking." (It will be appreciated by those skilled in the art that the GUIs depicted in FIG. 2 are merely exemplary and are not limiting in that many other various interfaces can be used to the same effect (e.g., an IP phone or an analog phone interface). In addition, although a visual interface is described, an audio interface could be used to the same effect. The foregoing holds true for substantially all interfaces described herein.) Thereafter, depicted is event 203 whereby participant C's network station 104 client, via a message sent over call management channel 110 to call manager 106 in response to participant C' input, invites user D's network station 120 client to join into the ongoing conference call involving participant A's network station 100 client, participant B's network station 102 client, and participant C's network station 104 client.

It will now be assumed for sake of illustration that call manager 106 is aware that user D's network station 120 client is busy (however, those skilled in the art will appreciate that typically the fact that user D's network station 120 client is busy is discerned by call manager 106 via a series of communications (not shown) with user D's network station 120 client). Consequently, illustrated is that call manager 106, in response to event 203 (participant C's 104 invitation to user D's network station 120 client to join) and the knowledge that user D's network station 120 client is currently busy, initiates event 202 whereby call manager 106, via a message sent over call manager-multipoint controller communication channel 201, directs multipoint controller 112 to send user D's network station 120 client a persistent invitation to join the ongoing conference call (as used herein, a persistent invitation means that the invitation will continue to persist and be viable for the length of the ongoing conference call, or for some length of time specified in the persistent invitation itself). Call manager-multipoint controller communication channel 201 may be a logical communication channel (e.g., in a software implementation), or a physical communication channel (e.g., in a hardware implementation).

In response to event 202 (call manager 106 directing multipoint controller 112 to invite user D's network station 120 client to join the ongoing conference call), shown is that multipoint controller 112 directs multipoint processor 114 to attempt to add user D's network station 120 client to the ongoing conference call between participant A's network station 100 client, participant B's network station 102 client, and participant C's network station 104 client In response to such direction, multipoint processor 114 requests that token generator 118 create a token associated with a persistent invitation to join the ongoing conference call. In response to such request, token generator 118 generates token 204 which can have a number of different fields such as a token ID field, a conference ID field, a password field, an expiration time field (which can be used to set a duration for the persistent invitation), and a conference call participant information field (a field which can contain information related to each network station client participating in the conference call, such information including but not limited to the identity of the participating network station client, the identity of the human user interacting with the participating network station client, the physical location of the participating network station client, etc.). Thereafter, event 206 shows that token 204 is sent to user D's network station 120 client. (It is to be understood, and it will be appreciated by those having ordinary skill in the art, that although the present description describes the actual passing of a token for sake of clarity, such "passing" could also be achieved in other ways, such as by passing a "reference" to the token, which can thereafter be used to retrieve state data which serves, or functions, as the "fields" of the actual token; accordingly, when the present description refers to passing a token it is intended that such passing also serve as an illustration of, and encompass, "passing" the token indirectly by a passing a reference to the token.) Those skilled in the art will appreciate that there are multiple ways that token 204 could be sent to user D's network station 120 client. One way in which token 204 can be sent is for multipoint controller 112 to send token 204, via call manager-multipoint controller communication channel 201, to call manager 106, thereafter call manager 106 forwards token 204 to user D's network station 120 client over call management channel 130. Alternatively, token 204 could be sent to participant D's network station 120 client over an unused media transport channel (not shown). In a different embodiment the token is stored in a proxy on behalf of user D's network station 120 client. The proxy may reside in call manager 106 or in a separate proxy server.

Token 204 carries with it information sufficient to alert user D's network station 120 client that participant C's network station 104 client is persistently inviting user D's network station 120 client to join in the ongoing conference call. However, upon receipt of token 204 by user D's network station 120 client, user D's network station 120 client is not free to join in the ongoing conference call due to the fact that user D's network station 120 client is in conversation with user E's network station 128 client Accordingly, illustrated is that token 204, upon receipt by user D's network station 120 client, is cached, or queued, and that substantially simultaneously notification that the invitation is pending is displayed via GUI 262 presented on the visual display device of user D's network station 120. (It will be appreciated by those skilled in the art that the GUIs depicted in FIG. 2 are merely exemplary and not limiting in that many other various interfaces can be used to the same effect (e.g., an IP phone or an analog phone interface). In addition, although a visual interface is described, an audio interface could be used to the same effect. The foregoing holds true for substantially all interfaces described herein.) As illustrated, the token may be queued in user D's network station 120 client, or may be queued in some other entity within the data communications network, such as call manager 106 or multipoint controller 112.

With reference now to FIG. 3, illustrated is that the conversation between user D's network station 120 client and user E's network station 128 client has terminated (such termination depicted by the fact that media transport channel 134 is no longer shown in FIG. 3). Depicted is that user D accepts the invitation to join the ongoing conference call by "clicking" arrow 261 on accept button 260 in GUI 262. (It will be appreciated by those skilled in the art that the GUIs depicted in FIG. 3 are merely exemplary and are not limiting in that many other various interfaces can be used to the same effect (e.g., an IP phone or an analog phone interface). In addition, although a visual interface is described, an audio interface could be used to the same effect. The foregoing holds true for substantially all interfaces described herein.) Thereafter, shown is event 300 whereby user D's network station 120 client returns token 204 to token processor 116, in order to alert token processor 116 that the invitation to user D's network station 120 client (token 204 has one or more fields which can be utilized to identify user D's network station 120 client) to join the ongoing conference call has been accepted (token 204 has one or more fields which can be utilized to identify the specific ongoing conference call). Those skilled in the art will appreciate that there are numerous ways in which token 204 can be sent to token processor 116; however, one way in which such may be achieved is to send token 204, via call management channel 130, to call manager 106 which thereafter forwards token 204, via call manager-multipoint controller communication channel 201, to multipoint controller 112, which thereafter delivers token 204 to token processor 116. Upon receipt of token 204, token processor 116 recognizes that user D's network station 120 client has indicated acceptance of the persistent invitation to join the ongoing conference call.

For ease of understanding, the acceptance of the persistent invitation is shown herein as being effected by user D's input to a graphical user interface associated with user D's network station 120 client. However, it is to be understood that such an invitation could be accepted by user D's input into another network station client. That is, once user D has been authenticated and has retrieved token 204, user D can utilize token 204 with virtually any client within the network to log into the ongoing conference call, irrespective of where user D, or the client he may be using, is physically located within the network.

Referring now to FIG. 4, shown is that multipoint processor 114, in response to receipt of token 204 by token processor 116, adds user D's network station 120 client to the ongoing conference call, which, as shown, results in "user" D becoming "participant" D. Multipoint processor 114 adds user D's network station 120 client by establishing media transport channel 400 between user D's network station 120 client and multipoint processor 114 in a fashion analogous to the way in which media transport channels 122, 124, and 126 were established. Subsequent to addition to the conference call, user D's network station 120 client functions as "participant" D's network station 120 client in the conference call. In addition, shown is that multipoint controller 112 causes a notification to be displayed on the visual display devices of participant A's network station 100, participant B's network station 102, participant C's network station 104, and "participant" D's network station 120 that "participant" D's network station 120 client has been added to the conference call. (It will be appreciated by those skilled in the art that the GUIs depicted in FIG. 4 are merely exemplary and are not limiting in that many other various interfaces can be used to the same effect (e.g., an IP phone or an analog phone interface). In addition, although a visual interface is described, an audio interface could be used to the same effect (e.g., "participant 1 has joined conference"). The foregoing holds true for substantially all interfaces described herein.)

The foregoing discussion has utilized FIGS. 1-4 to demonstrate a device and process for providing a mechanism to allow network station clients to join in an ongoing conference call when the network station client is unavailable when the invitation is extended. The following is a more formal and enhanced description of the forgoing-described process.

With reference now to FIG. 5 and FIGS. 1-4, depicted is a high-level logic flowchart illustrating in more detail a process by which a participant can be added to an ongoing conference call. Method step 500 shows the start of the process. Method step 502 depicts the existence of the data communications network state illustrated in FIG. 1, wherein participant A's network station 100 client, participant B's network station 102 client, and participant C's network station 104 client are in a conference call, while user D 120 (as used herein the term "participant" indicates participation in a conference call, and the term "user" indicates a network station client not participating in a conference call) is engaged in a call with user E's network station 128 client.

Method step 504 illustrates the event of participant C's network station 104 client inviting user D's network station 120 client to join the ongoing conference call, such as was illustrated in FIG. 2. Thereafter, method step 506 shows the inquiry as to whether user D's network station 120 client is busy (e.g., in conversation with another data communication system user), which can be accomplished via communication between call manager 106 and user D's network station 120 client over call management channel 132. In the event that the inquiry of method step 506 yields a determination that user D's network station 120 client is busy, the process proceeds to method step 508 wherein is depicted the operation of multipoint controller 112 creating token 204, associated with a persistent invitation to join the ongoing conference call, as was discussed above in relation to FIG. 2. Subsequently, method step 510 illustrates multipoint controller 112 queuing token 204 to the Camp-On application program, resident within and running on user D's network station 120 client. Thereafter, method step 512 shows the event of the Camp-On application program, resident within and running on user D's network station 120, presenting the invitation to join the ongoing conference call to user D, which in one instance is done by presentation of an icon within a graphical user interface such as was discussed in relation to FIG. 3, but which could also be achieved via use of an auditory signal such as the ringing of a bell-like signal on a speaker of user D's network station 120.

Prior to discussing method steps 520 and 514 individually, it should be noted that method steps 520 and 514 are actually working in tandem to determine whether the "user busy" situation or the ongoing conference call ends first. Method steps 520 and 514 provide the Camp-On (Camp-On is a term of art referring to substantially continuously attempting to contact a user's initially unresponsive communication system (e.g., network station client) until the user's communication system responds) function by waiting for user D's network station 120 client to become available, while monitoring that the conference call is still ongoing. Consequently, shown is that the process will "loop" through method steps 520 and 514 until either user D's network station 120 client becomes available or until the conference call ends. In the event that the inquiry of method step 520 yields a determination that user D's network station 120 client is still busy, the process proceeds to method step 514 wherein is depicted an inquiry as to whether the conference call is still ongoing. (The determination as to whether the conference call is still ongoing can be made in any one of a number of ways, such as by having Call Manager 106 periodically inform the Camp-On application program, resident on user D's network station 120, as to the status of the conference call, or by having multipoint controller 112 inform the Camp-On application program that the conference call is complete upon conference call termination, or by having the Camp-On application program, resident on user D's network station 120, periodically query multipoint controller 112 as to the status of the conference call.) In the event that the conference call is still ongoing, the process proceeds to method step 520 and continues from that point. In the event that the conference call has terminated (i.e., is complete) the process proceeds to method step 516 wherein is depicted the event of the Camp-On application program, resident on user D's network station 120, releasing the reference to token 204 and removing the graphical user interface notification of the persistent invitation from the display device of user D's network station 120. Thereafter, method step 518 shows that the Camp-On application program enters an idle state, and the associated Camp-On token is released.

In the event that the inquiry of method step 520 yields a determination that user D's network station 120 client is no longer busy, the process proceeds to method step 522 wherein is illustrated the inquiry as to whether input has been received indicating that user D accepts or rejects the persistent invitation to join the ongoing conference call (e.g., by user D clicking a graphical user interface icon such as that illustrated in FIG. 3). In the event that the inquiry of method step 522 yields a determination that user D has rejected the invitation, the process proceeds to method step 532 wherein is depicted the event that the Camp-On application program resident on user D's network station 120 rejects the invitation referenced by token 204, in which case the ongoing conference continues unchanged as illustrated in method step 533.

In the event that the inquiry of method step 522 yields a determination that input has been received indicating that user D has accepted the invitation (e.g., by user D clicking an graphical user interface icon such as that illustrated in FIG. 3), the process proceeds to method step 524 wherein is depicted the event of the Camp-On application program accepting the persistent invitation referenced by token 204, which is achieved by token 204 being transmitted to token processor 116 as discussed in relation to FIG. 3. Thereafter, the process proceeds to method step 526 wherein it is illustrated that user D's network station 120 client is added to the ongoing conference call, and visual notification of such addition is displayed, in the fashion discussed above in relation to FIG. 4. Subsequently, the process proceeds to method step 528 wherein is shown that the ongoing conference call now has four participants, such as was illustrated in FIG. 4. Thereafter, the process proceeds to method step 530 which shows that the conference continues.

In the event that the inquiry of method step 506 yields a determination that user D's network station 120 client is not busy, the process proceeds to method step 534 wherein is depicted the operation of a standard teleconference application program (the workings of which are well known to those within the art), resident within user D's network station 120, alerting user D of the invitation via a ringing sound, or other similar indication, such as the presentation of a graphical user interface icon on display device of user D's network station 120. Thereafter, the process proceeds to method step 536 wherein is depicted the inquiry as to whether user input has been received, within a pre-specified time period, by the standard teleconference application program that user D has acknowledged the invitation to join the ongoing conference call (e.g., by user D clicking a graphical user interface button acknowledging the invitation, or by user D lifting a telephone handset (not shown)).

In the event that the inquiry of method step 536 yields a determination that user D has acknowledged the invitation to join the ongoing conference call within a pre-specified time period, the process proceeds to method step 538 wherein is depicted the inquiry as to whether input has been received (e.g., by user D clicking an "accept" graphical user interface icon) indicating that user D accepts or rejects the invitation to join the ongoing conference call. In the event that the inquiry of method step 538 yields a determination that user D has declined to accept the invitation, the process proceeds to method step 540 wherein is depicted the event that the ongoing conference continues unchanged and the associated Camp-On token is released. In the event that the inquiry of method step 538 yields a determination that input has been received indicating that user D has accepted the invitation, the process proceeds to method step 542 wherein is depicted the event of the standard teleconference application program accepting the invitation to join the conference, and thus illustrated is that user D's network station 120 client is added to the ongoing conference call in the usual fashion well known to those within the art. Subsequently, the process proceeds to method step 528 wherein is shown that the ongoing conference call now has four participants such as was illustrated in FIG. 4. Thereafter, the process proceeds to method step 530 which shows the end of the process.

In the event that the inquiry of method step 536 yields a determination that user D has not acknowledged the invitation to join the ongoing conference call within a specified period of time, the process proceeds to method step 544 wherein is depicted the operation of multipoint controller 112 creating token 204, associated with a persistent invitation (as opposed to the non-persistent invitation which has been referred to in relation to method step 536 and 538) to join the ongoing conference call, as was discussed above in relation to FIG. 2. Subsequently, method step 546 illustrates multipoint controller 112 queuing token 204 to the Camp-On application program, resident within and running on user D's network station 120. which may cache the token locally or in another network location as was discussed in FIG. 2. Thereafter, method step 548 shows the event of the Camp-On application program, resident within user D's network station 120, presenting the invitation to join the ongoing conference call on user D's network station 120, which in one instance is done by presentation of an icon within a graphical user interface as was discussed in relation to FIG. 3, but which could also be achieved via use of an auditory signal such as the ringing of a bell-like tone through a speaker of user D's network station 120, a conference call Camp-On LED indicator, a conference call Camp-On email message, a voice-mail conference call Camp-On message, or a conference call Camp-On pager notification.

Subsequent to method step 548, the process proceeds to method step 550 wherein is depicted an inquiry as to whether the conference call is still ongoing. (The determination as to whether the conference call is still ongoing can be made by either the Camp-On application program resident within user D's network station 120 periodically querying multipoint controller 112 as to the status of the ongoing conference call, or by having multipoint controller 112 inform the Camp-On application program that the conference call is complete upon conference call termination, or by utilizing the known call status in Call Manager 106.) In the event that the conference call has terminated (i.e., is complete) the process proceeds to method step 552 wherein is depicted the event of the Camp-On application program, resident within user D's network station 120, releasing the reference to token 204 and removing the presented notice (e.g., removing the graphical user interface icon or ringing indication on user D's network station 120) that a persistent invitation to join an ongoing conference call has been extended. Thereafter, method step 554 shows that the Camp-On application program enters an idle state.

Prior to discussing the interaction of method step 550 and 556, it should be noted that method steps 550 and 556 are actually working in tandem to determine whether user D answers the conference call indication (method step 556) before the ongoing conference call ends. Consequently, shown is that process will "loop" through method steps 550 and 560 until either user D answers the conference call indication or until the conference call ends.

Returning now to a sequential discussion of FIG. 5, it is seen that in the event that the inquiry of method step 550 yields a determination that the conference call is still ongoing, the process proceeds to method step 556 wherein is depicted the inquiry as to whether user input has been received that user D has accepted or rejected the persistent invitation to join the ongoing conference call (e.g., by user D clicking a graphical user interface button accepting or rejecting the invitation, or by user D lifting a telephone handset and pressing the conference acceptance key sequence). In the event that the inquiry of method step 556 yields a determination that user D has accepted or rejected the persistent invitation to join the ongoing conference call, the process proceeds to method step 522 and proceeds from that point in the fashion discuss previously. In the event that the inquiry of method step 556 yields a determination that user D has neither accepted nor rejected the persistent invitation to join the ongoing conference call, the process proceeds to method step 550 and proceeds from that point in the fashion discussed previously.

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of media used to actually carry out the distribution. Examples of such media include but are not limited to the following: recordable type media such as floppy disks, hard disk drives, CD ROMs, and digital tape.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. A method comprising:
   extending a persistent invitation to a first network station client to join an ongoing conference call in response to a determination that the first network station client is unavailable to accept a non-persistent invitation to join the ongoing conference call, wherein the extending is performed after the ongoing conference call has begun and comprises,
   issuing a token to the first network station client;
   detecting an activation of the token by the first network station client; and
   adding the first network station client to the ongoing conference call in response to the detecting.

2. The method of claim 1, wherein the extending further comprises:
   receiving a message indicating that the first network station client is busy.

3. The method of claim 1, wherein the extending further comprises:
   determining that the first network station client is not responding to the non-persistent invitation to join the conference call within a specified time period.

4. The method of claim 1, wherein the token comprises:
   at least one field selected from the group comprising a token ID field, a conference ID field, a password field, an expiration time field, and a conference call participant information field.

5. The method of claim 1, wherein the detecting comprises:
   detecting that the first network station client has returned the token to a token processor in indication that the first network station client has accepted the persistent invitation to join the ongoing conference call.

6. The method of claim 1, further comprising:
   withdrawing the persistent invitation upon termination of the conference call wherein the withdrawing comprises releasing the token at the first network station client.

7. The method of claim 2, further comprising:
   extending the non-persistent invitation to the first network station client to join the ongoing conference call;
   wherein the receiving the message occurs in response to the non-persistent invitation, and the extending the persistent invitation is performed in response to the receiving the message.

8. The method of claim 4, wherein the token further comprises a reference used to retrieve state data where such state data functions as at least one field selected from the group comprising a token ID field, a conference ID field, a password field, an expiration time field, and a conference call participant information field.

9. The method of claim 6, wherein
the withdrawing further comprises notifying the first network station client that the conference call has been terminated, and
the releasing comprises releasing the token at the first network station client in response to the notifying.

10. The method of claim 9, wherein the notifying comprises:
notifying the first network station client that the conference call has been terminated using a multipoint controller.

11. A system comprising:
means for extending a persistent invitation, after an ongoing conference call has begun, to a first network station client to join the ongoing conference call in response to a determination that the first network station client is unavailable to accept a non-persistent invitation to join the ongoing conference call, wherein the means for extending comprises,
means for issuing a token to the first network station client;
means for detecting an activation of the token by the first network station client; and
means for adding the first network station client to the ongoing conference call in response to the activation.

12. The system of claim 11, wherein the means for extending comprises:
means for receiving a message indicating that the first network station client is busy.

13. The system of claim 11, wherein the means for extending comprises:
means for determining that the first network station client is not responding to the non-persistent invitation to join the conference call within a specified time period.

14. The system of claim 11, wherein the token comprises at least one field selected from the group comprising a token ID field, a conference ID field, a password field, an expiration time field, and a conference call participant information field.

15. The system of claim 11, wherein the means for detecting comprises:
means for detecting that the first network station client has returned the token to a token processor in indication that the first network station client has accepted the persistent invitation to join the ongoing conference call.

16. The system of claim 11, further comprising:
means for withdrawing the persistent invitation upon termination of the conference call, wherein the means for withdrawing comprises
means for releasing the token at the first network station client.

17. The system of claim 12, further comprising:
means for extending the non-persistent invitation to the first network station client to join the ongoing conference call;
wherein the message occurs in response to the non-persistent invitation, and the means for extending the persistent invitation is responsive to the receiving the message.

18. The system of claim 14, wherein a token further comprises a reference used to retrieve state data where such state data functions as at least one field selected from the group comprising a token ID field, a conference ID field, a password field, an expiration time field, and a conference call participant information field.

19. The system of claim 16, wherein
the means for withdrawing further comprises:
means for notifying the first network station client that the conference call has been terminated, and
the means for releasing comprises means for releasing the token at the first network station client in response to the notifying.

20. The system of claim 19, wherein the means for notifying comprises a multipoint controller.

21. A computer-readable medium comprising:
a computer-readable storage medium; and
software code encoded on the computer-readable storage medium and executable by one or more processor to implement each of:
extending a persistent invitation to a first network station client to join an ongoing conference call in response to a determination that the first network station client is unavailable to accept a non-persistent invitation to join the ongoing conference call, wherein the extending is performed after the ongoing conference call has begun and comprises issuing a token to the first network station client,
detecting an activation of the token by the first network station client, and
adding the first network station client to the ongoing conference call in response to the detecting.

22. The computer-readable medium of claim 21, wherein the computer-readable storage medium comprises recordable media.

23. The computer-readable medium of claim 21, wherein the software code is further executable by the processor to implement:
withdrawing the persistent invitation upon termination of the conference call wherein the withdrawing comprises releasing the token at the first network station client.

24. The computer-readable medium of claim 21, wherein the software code is further executable by the processor to implement each of:
extending the non-persistent invitation to the first network station client to join the ongoing conference call; and
receiving, in response to the non-persistent invitation, a message indicating that the first network station client is busy;
wherein the extending the persistent invitation is performed in response to the receiving the message.

25. A method comprising:
receiving at an initially unavailable network station client a persistent invitation to join an ongoing conference call, wherein the receiving the persistent invitation occurs after the ongoing conference call has begun and comprises,
receiving a token indicative of the persistent invitation to join the ongoing conference call at the initially unavailable network station client;
activating the token in response to user input to a network station client selected from the group comprising the initially unavailable network station client and another network station client; and
adding the network station client to the ongoing conference call in response to the activating.

26. The method of claim 25, wherein the token comprises at least one field selected from the group comprising a token ID field, a conference ID field, a password field, an expiration time field, and a conference call participant information field.

27. The method of claim 25, wherein the activating comprises:
accepting user input indicating that the persistent invitation to join the ongoing conference call has been accepted; and transmitting the token to a multipoint controller as an indication that the persistent invitation to join the ongoing conference call has been accepted.

28. The method of claim 25, further comprising:
withdrawing an ability to activate the token in response to a notification that the conference call has terminated.

29. The method of claim 26, wherein the token further comprises:
a reference used to retrieve state data where such state data functions as at least one field selected from the group comprising a token ID field, a conference ID field, a password field, an expiration time field, and a conference call participant information field.

30. The method of claim 26, further comprising:
presenting an alert that the persistent invitation to join the conference call has been received, wherein the presenting comprises, presenting at least one visual alert from the group comprising a Graphical User Interface icon, a conference call Camp-On LED indicator, and a conference call Camp-On email message.

31. The method of claim 26, further comprising:
presenting an alert that the persistent invitation to join the conference call has been received, wherein the presenting comprises, presenting an auditory alert selected from the group comprising a notification via a network station speaker, a voice-mail conference call Camp-On message, or a conference call Camp-On pager notification.

32. The method of claim 27, wherein the token further comprises:
identification of a transmitting user as a valid participant in the ongoing conference call.

33. The method of claim 27, wherein the transmitting comprises retrieving the token from a cache.

34. The method of claim 28, wherein the withdrawing comprises withdrawing a presented notice that the persistent invitation to join the conference call has been extended.

35. The method of claim 33, wherein the retrieving comprises retrieving the token from a cache local to an invited network station client.

36. The method of claim 33, wherein the retrieving comprises retrieving the token from a cache local to a network server.

37. A system comprising:
means for receiving at an initially unavailable network station client, after an ongoing conference call has begun, a persistent invitation to join the ongoing conference call, wherein the means for receiving comprises,
means for receiving a token indicative of the persistent invitation to join the ongoing conference call;
means for activating the token in response to user input to a network station client selected from the group comprising the initially unavailable network station client and another network station client; and
means for adding the network station client to the ongoing conference call in response to an activation of the token.

38. The system of claim 37, wherein the token comprises at least one field selected from the group comprising a token ID field, a conference ID field, a password field, an expiration time field, and a conference call participant information field.

39. The system of claim 37, wherein the means for activating comprises:
means for accepting user input indicating that the persistent invitation to join the ongoing conference call has been accepted; and
means for transmitting the token to a multipoint controller as an indication that the persistent invitation to join the ongoing conference call has been accepted.

40. The system of claim 37, further comprising:
means for withdrawing an ability to activate the token in response to a notification that the conference call has terminated.

41. The system of claim 38, wherein the token comprises a reference used to retrieve state data where such state data functions as at least one field selected from the group comprising a token ID field, a conference ID field, a password field, an expiration time field, and a conference call participant information field.

42. The system of claim 38, further comprising:
means for presenting an alert that the persistent invitation to join the conference call has been received wherein the means for presenting comprises:
means for presenting at least one visual alert from the group comprising a Graphical User Interface icon, a conference call Camp-On LED indicator, and a conference call Camp-On email message.

43. The system of claim 38, further comprising:
means for presenting an alert that the persistent invitation to join the conference call has been received wherein the means for presenting comprises:
means for presenting an auditory alert selected from the group comprising a notification via a network station speaker, a voice-mail conference call Camp-On message, or a conference call Camp-On pager notification.

44. The system of claim 39, wherein the token further comprises identification of a transmitting user as a valid participant in the ongoing conference call.

45. The system of claim 39, wherein the means for transmitting comprises means for retrieving the token from a cache.

46. The system of claim 40, wherein the means for withdrawing comprises means for withdrawing a presented notice that the persistent invitation to join the conference call has been extended.

47. The system of claim 45, wherein the means for retrieving comprises means for retrieving the token from a cache local to an invited network station client.

48. The system of claim 45, wherein the means for retrieving comprises the token from a cache further includes:
means for retrieving the token from a cache local to a network server.

49. A computer program product comprising:
a computer-readable storage medium having instructions encoded thereon, wherein the instructions are executable by one or more processor and the instructions comprise:
instructions for receiving at an initially unavailable network station client a persistent invitation to join an ongoing conference call, wherein the receiving the persistent invitation occurs after the ongoing conference call has begun,
instructions for receiving a token indicative of the persistent invitation to join the ongoing conference call at the initially unavailable network station client,
instructions for activating the token in response to user input to a network station client selected from the group comprising the initially unavailable network station client and another network station client, and
instructions for adding the network station client to the ongoing conference call in response to the activating.

50. The computer-readable medium of claim 49, wherein the computer-readable storage medium comprises recordable media.

51. The computer-readable medium of claim 49, wherein the computer-readable storage medium comprises a CD ROM.

52. The computer program product of claim 49, wherein the token comprises at least one field selected from the group comprising a token ID field, a conference ID field, a password field, an expiration time field, and a conference call participant information field.

53. The computer program product of claim 49, wherein the instructions for activating comprise:
   instructions for accepting user input indicating that the persistent invitation to join the ongoing conference call has been accepted; and
   instructions for transmitting the token to a multipoint controller as an indication that the persistent invitation to join the ongoing conference call has been accepted.

54. The computer program product of claim 49, further comprising:
   instructions for withdrawing an ability to activate the token in response to a notification that the conference call has terminated, wherein the instructions for withdrawing comprise instructions for withdrawing a presented notice that the persistent invitation to join the conference call has been extended.

55. The computer program product of claim 52, wherein the token further comprises a reference used to retrieve state data where such state data functions as at least one field selected from the group comprising a token ID field, a conference ID field, a password field, an expiration time field, and a conference call participant information field.

56. The computer program product of claim 52, further comprising:
   instructions for presenting an alert that the persistent invitation to join the conference call has been received, wherein the presenting comprises presenting at least one alert from the group comprising: a visual alert and an auditory alert.

57. The computer program product of claim 53, wherein the token further comprises:
   identification of a transmitting user as a valid participant in the ongoing conference call.

58. The computer program product of claim 53, wherein:
   the instructions for transmitting comprise instructions for retrieving the token from a cache; and
   the instructions for retrieving comprise instructions for retrieving the token from a cache local to an invited network station client.

59. A system comprising:
   a conferencing engine configured to establish a conference call; and
   a token generator configured to extend a persistent invitation to a first network station client to join an ongoing conference call; wherein:
      the persistent invitation is extended in response to a determination that the first network station client is unavailable to accept a non-persistent invitation to join the ongoing conference call,
      the persistent invitation is extended after the ongoing conference call has begun,
      the persistent invitation comprises a token issued to the first network station client, and
      the token is configured so that an activation of the token by the first network station client initiates adding the first network station client to the ongoing conference call.

\* \* \* \* \*